(12) United States Patent
Eick et al.

(10) Patent No.: US 9,134,456 B2
(45) Date of Patent: Sep. 15, 2015

(54) ELECTRICAL METHODS SEISMIC INTERFACE BOX

(75) Inventors: Peter M. Eick, Houston, TX (US); Joel D. Brewer, Houston, TX (US); Frank D. Janiszewski, Richmond, TX (US)

(73) Assignee: ConocoPhillips Company, Houston, TX (US)

( * ) Notice: Subject to any disclaimer, the term of this patent is extended or adjusted under 35 U.S.C. 154(b) by 403 days.

(21) Appl. No.: 13/297,456

(22) Filed: Nov. 16, 2011

(65) Prior Publication Data

US 2012/0130644 A1    May 24, 2012

Related U.S. Application Data

(60) Provisional application No. 61/416,580, filed on Nov. 23, 2010, provisional application No. 61/416,584, filed on Nov. 23, 2010.

(51) Int. Cl.
| | |
|---|---|
| *G06F 19/00* | (2011.01) |
| *G01V 11/00* | (2006.01) |
| *G01V 1/24* | (2006.01) |
| *G01V 1/20* | (2006.01) |
| *G01V 1/00* | (2006.01) |
| *G01V 1/16* | (2006.01) |

(52) U.S. Cl.
CPC ............ *G01V 11/002* (2013.01); *G01V 1/003* (2013.01); *G01V 1/16* (2013.01); *G01V 1/201* (2013.01); *G01V 1/24* (2013.01)

(58) Field of Classification Search
CPC ....... G01V 1/38; G01V 1/3808; G01V 1/201; G01V 1/3852; G01V 1/16; G01V 11/002; G01V 1/24; G01V 1/003; G01V 2200/12

USPC ........ 702/13, 14; 367/37, 15, 38, 76, 188, 20; 166/250.1

See application file for complete search history.

(56) References Cited

U.S. PATENT DOCUMENTS

| | | | |
|---|---|---|---|
| 4,282,515 A * | 8/1981 | Patterson, III | ................ 341/118 |
| 4,446,433 A | 5/1984 | Shuck | |
| 5,627,798 A * | 5/1997 | Siems et al. | .................... 367/76 |
| 5,878,937 A * | 3/1999 | Green et al. | ............... 227/175.2 |
| 5,963,508 A * | 10/1999 | Withers | .......................... 367/38 |
| 6,116,342 A | 9/2000 | Clark et al. | |
| 6,330,914 B1 | 12/2001 | Hocking et al. | |
| 6,725,930 B2 * | 4/2004 | Boney et al. | ............... 166/280.2 |
| 6,898,529 B2 * | 5/2005 | Gao et al. | ........................ 702/11 |
| 7,073,581 B2 | 7/2006 | Nguyen et al. | |
| 7,082,993 B2 | 8/2006 | Ayoub et al. | |
| 7,210,526 B2 | 5/2007 | Knobloch | |
| 7,223,962 B2 * | 5/2007 | Fageraas et al. | ......... 250/227.14 |
| 7,424,911 B2 | 9/2008 | McCarthy et al. | |

(Continued)

FOREIGN PATENT DOCUMENTS

| | | |
|---|---|---|
| WO | WO2009151891 | 12/2009 |
| WO | WO2010019424 | 2/2010 |

OTHER PUBLICATIONS

Brian Anderson, et al., Autonomous Nodes for Time Lapse Reservoir Seismic: An Alternative to Permanent Seabed Arrays, PESA News, Jun./Jul. 2009, pp. 52-54.

*Primary Examiner* — Carol S Tsai
(74) *Attorney, Agent, or Firm* — ConocoPhillips Company

(57) ABSTRACT

The present invention relates to a method and apparatus for evaluating the geometry of a fracture.

15 Claims, 2 Drawing Sheets

(56) References Cited

U.S. PATENT DOCUMENTS

| | | |
|---|---|---|
| 7,450,053 B2 | 11/2008 | Funk et al. |
| 7,451,812 B2 | 11/2008 | Cooper et al. |
| 7,561,493 B2 * | 7/2009 | Ray et al. .................. 367/188 |
| 7,712,527 B2 | 5/2010 | Roddy |
| 7,726,397 B2 | 6/2010 | McDaniel et al. |
| 7,754,659 B2 | 7/2010 | Rediger et al. |
| 7,986,589 B2 * | 7/2011 | Ray et al. .................. 367/76 |
| 8,427,900 B2 * | 4/2013 | Fleure et al. .................. 367/15 |
| 8,773,132 B2 * | 7/2014 | Eick et al. .................. 324/324 |
| 8,869,888 B2 * | 10/2014 | Cramer et al. ............. 166/250.1 |
| RE45,268 E * | 12/2014 | Ray et al. .................. 367/76 |
| 2003/0038634 A1 * | 2/2003 | Strack .................. 324/323 |
| 2005/0017723 A1 | 1/2005 | Entov et al. |
| 2006/0102345 A1 * | 5/2006 | McCarthy et al. ......... 166/250.1 |
| 2007/0256830 A1 | 11/2007 | Entov et al. |
| 2008/0062036 A1 * | 3/2008 | Funk et al. .................. 342/22 |
| 2009/0087912 A1 * | 4/2009 | Ramos et al. .................. 436/27 |
| 2009/0166030 A1 | 7/2009 | Zhuravlev et al. |
| 2009/0179649 A1 | 7/2009 | Schmidt |
| 2009/0250216 A1 | 10/2009 | Bicerano |
| 2009/0288820 A1 | 11/2009 | Barron et al. |
| 2010/0017139 A1 * | 1/2010 | Adams et al. .................. 702/14 |
| 2010/0038083 A1 | 2/2010 | Bicerano |
| 2010/0039892 A1 * | 2/2010 | Ray et al. .................. 367/37 |
| 2010/0100330 A1 * | 4/2010 | Burkholder et al. .......... 702/14 |
| 2010/0147512 A1 * | 6/2010 | Cramer et al. ............. 166/250.1 |
| 2010/0293245 A1 * | 11/2010 | Ray et al. .................. 709/217 |
| 2010/0329076 A1 * | 12/2010 | Ray et al. .................. 367/20 |
| 2011/0051550 A1 * | 3/2011 | Lindberg .................. 367/20 |
| 2011/0292758 A1 * | 12/2011 | Fleure et al. .................. 367/20 |
| 2011/0310704 A1 * | 12/2011 | Ray et al. .................. 367/188 |
| 2012/0146648 A1 * | 6/2012 | Eick et al. .................. 324/334 |
| 2012/0294122 A1 * | 11/2012 | Ray et al. .................. 367/149 |
| 2014/0142858 A1 * | 5/2014 | Adams et al. .................. 702/14 |

* cited by examiner

ELECTRICAL METHODS SEISMIC INTERFACE BOX

CROSS-REFERENCE TO RELATED APPLICATIONS

This application claims priority benefit under 35 U.S.C. Section 119(e) to U.S. Provisional Patent Ser. No. 61/416,580 filed on Nov. 23, 2010 the entire disclosure of which is incorporated herein by reference.

This application claims priority benefit under 35 U.S.C. Section 119(e) to U.S. Provisional Patent Ser. No. 61/416,584 filed on Nov. 23, 2010 the entire disclosure of which is incorporated herein by reference.

FIELD OF THE INVENTION

The present invention relates to a method and apparatus for evaluating the geometry of a fracture. More particularly, the present invention relates to an electrical methods seismic interface box and a method of using the apparatus to record electrical methods geophysical data.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often hydraulically fractured to stimulate production of hydrocarbons from the wellbore. Hydraulic fractures are created in subterranean formations by hydraulically injecting water or high viscosity fluid (also referred to as fracturing fluid) containing a proppant at a high flow rate into a wellbore and forcing the fracturing fluid against the formation strata by pressure. The formation strata or rock is forced to crack, creating or enlarging one or more fractures. The proppant subsequently prevents the fracture from closing completely and thus provides improved flow of recoverable fluid, i.e., oil, gas or water.

Because aging wells are often produced from multiple intervals, some very thin, the ability to locate these stimulation treatments with pinpoint accuracy is key to more effective remediation and increased ultimate recovery. An accurate method of visualizing fracture length, proppant penetration, and estimated flow in the created fracture are required to precisely access production capabilities and the need for further remediation before production is initiated.

Numerous techniques exist for detecting the fracture geometry of a well using various imaging techniques. For example, Hocking et al., U.S. Pat. No. 6,330,914 provides a method for monitoring a propagating vertical fracture in a formation by injecting conductive fracture fluid into the formation to initiate and propagate the fracture; energizing the fracture fluid while the fracture propagates; and measuring the inducted electromagnetic field parameters to judge the fracture development and geometry. Further, McCarthy, et al., WO2007013883, introduces a target proppant; transmits electromagnetic radiation from about 300 megahertz-100 gigahertz; and analyzes a reflected signal from the target particle to determine fracture geometry. Lastly, Nguyen et al., U.S. Pat. No. 7,073,581, describes an electroconductive proppant composition and related methods of obtaining data from a portion of a subterranean formation. All of these techniques focus on detecting data utilizing coated proppants and electrical currents applied in a bore hole setting.

These and other conventional techniques for detecting fracture geometry fail to account for how the data in the field is actually measured. These techniques are generally single sensor based approaches, which either measure the information in the borehole or between boreholes. On the surface, these techniques use a single sensor and move the sensor back and forth in a grid like fashion around the surface with an individual receiver and individually recorded data is utilized to make a map of the results. This map can then be used to model or infer the size and nature of the fracture body.

One of the critical flaws in this approach is the significant time required to make all of these individual measurements. Additionally, it is common for the field being measured to change over time due to earth effects, like the changing magnetic field, sunspots, and movement of man and equipment on the surface.

Knowing, measuring, and translating data from various sensors and tools is of prime importance to the completion engineer in order to determine if fracturing was successful and as a predictor of expected production rates from the well. It is therefore an object of the present invention to provide a method and apparatus for evaluating the geometry of a fracture.

SUMMARY OF THE INVENTION

In an embodiment, an apparatus for evaluating the geometry of a fracture includes: (a) a housing; (b) at least one input connector forming part of the housing coupled to at least one sensor for receiving data therefrom; (c) a data output connector forming part of the housing coupled to a seismic data recorder; and (d) a circuit disposed in the housing for converting data from the sensor to a seismic data compatible format.

In another embodiment, an apparatus for evaluating the geometry of a fracture includes: (a) a housing; (b) at least one input connector forming part of the housing coupled to at least one sensor for receiving data therefrom; (c) a circuit disposed in the housing for converting data from the sensor; (d) a seismic data recorder disposed in the housing; and (e) a data output connector for transferring data from the circuit to the seismic data recorder.

In another embodiment, a method for evaluating the geometry of a fracture includes: (a) charging a fracture with an electrical signal; (b) detecting the electrical signal; (c) transmitting the electrical signal to a seismic interface box, wherein the seismic interface box converts the electrical signal to a seismic data compatible format; and (d) recording the voltage based signal from the seismic interface box.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

The present invention provides a seismic interface box for converting data provided by sensors, such as electromagnetic (EM), electrical, gravimetric or magnetic based sensors, into voltage based signals compatible with conventional 24 bit seismic survey equipment, such as a conventional seismic recorder. The geophysical techniques described will be collectively referred to as "electrical methods and potential fields" or more simply "electrical methods". By converting the electrical methods data from the sensor, into an electrical signal that the seismic recorder can accurately measure, the seismic recorder can be used to record simultaneous measurements of the desired electromagnetic or similar field related data in real time at many different stations simultaneously. In an embodiment, the seismic interface box understands the low voltages from field equipment, for example, EM equipment, and converts this data to a voltage based signal that can then be digitized by the seismic data recorder and stored. The data can be stored as a standard SEG Y data file or shot record of the experiment. This allows one to store the measurements as a function of time over a large three dimensional (3D) area simultaneously. A conventional seismic data recorder is a 24 bit recorder and has about 140 decibels (dB) of dynamic ranges, which adequately measures most EM, resistivity or magnetic based sensors. However, there is no limitation to a 24 bit recorder and higher or lower bit counts which can be used if necessary or available.

Figure 1:
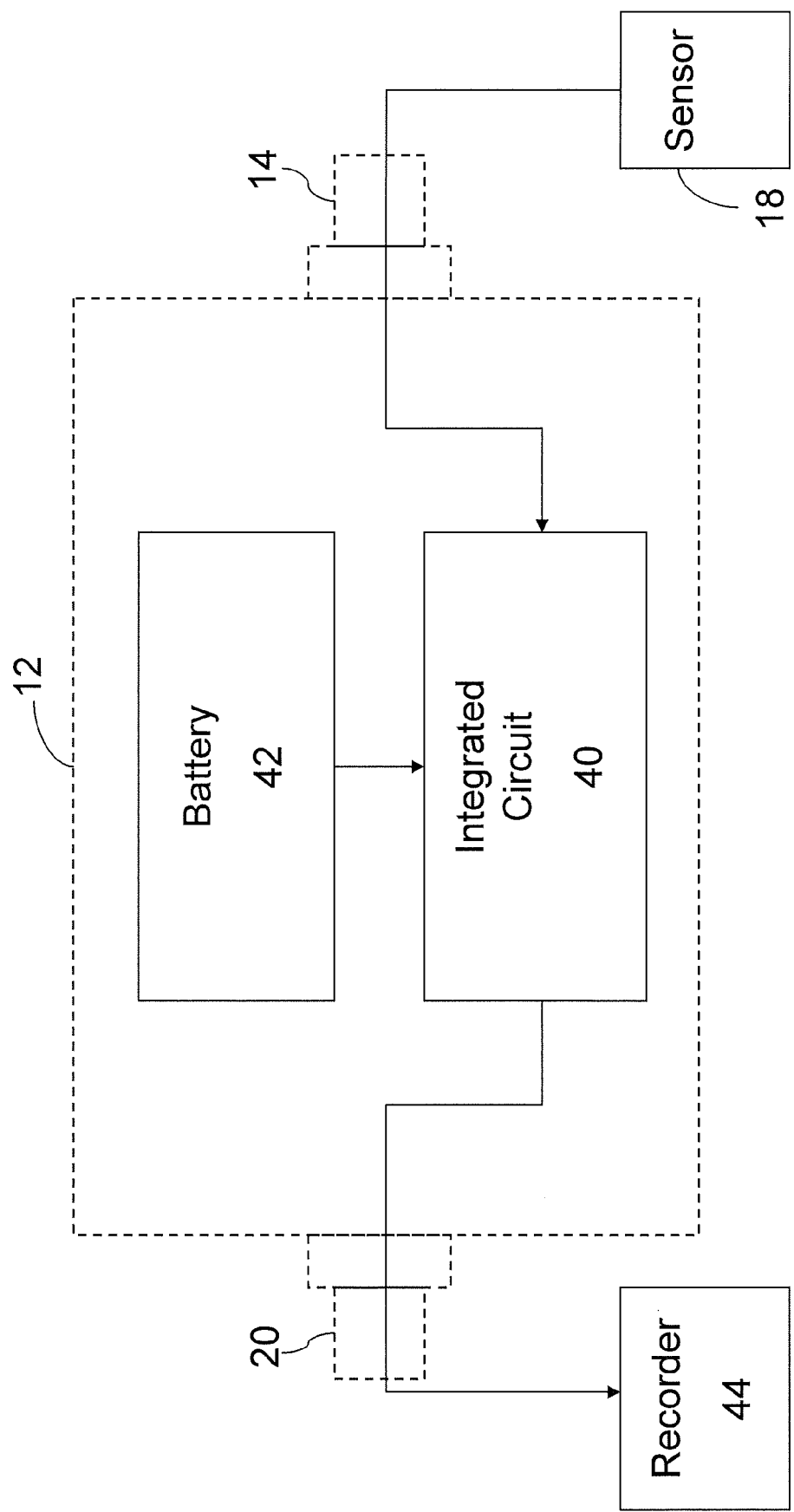
FIG. 1 is a schematic diagram illustrating an embodiment for evaluating the geometry of a fracture.

Turning now to the drawings wherein like numerals indicate like parts. FIG. 1 illustrates an embodiment of a seismic interface box for evaluating the geometry of a fracture. A lightweight sealed housing 12 is designed to withstand expected environmental conditions. At least one input connector 14 and at least one output connector 20 form part of the housing. The input connector 14 receives data from at least one sensor 18 via one or more strings. The sensors can measure, for example, self potential, induced potential, resistivity, electromagnetic gravity and magnetic surveying. The sensors can either be externally disposed, i.e., surface based, or internally disposed, i.e., within the wellbore. The sensors are arranged in a 3D grid configuration on the surface over the area around the wellbore or can be located at multiple levels in the wellbore. The extent of the grid can be adjusted to suit the resolution and read requirements of the individual well or the geographical and geophysical constraints of the project. The grid of sensors are time stamped and synchronized to global positioning time (GPS), so a baseline survey can be readily measured. The data output connector is coupled to a seismic data recorder 44 and stored as conventional SEGY seismic data.

In an embodiment, the seismic interface box can be combined with autonomous nodal seismic data recorders. This creates a fully autonomous electrical methods recorder that can be easily transported and used without the limitations of wire based seismic recording technology. The seismic interface box can be external to and independent of the seismic recorder, so as to be connected to the autonomous recorder for example the Geospace Seismic Recorder (GSR) provided by OYO Geospace®. The seismic interface box can be made internally and incorporated as a board into the construction of the Fairfield Industries Z Land® recorder as an example. In some embodiments, the sensor package can be incorporated into the autonomous unit as could be done with an EM coil.

As shown in FIG. 1, a circuit 40 and a battery 42 are disposed within housing 12. The battery 42 provides a power supply to the integrated circuit 40. In an embodiment, the battery 42 is externally located. In another embodiment, the power for the battery 42 is taken from the seismic data recorder. The circuit 40 receives data from the sensor 18 in the form of an electrical signal and subsequently impedance and reactance balance the voltage so that it is within the range of the sensitivity and compatibility of a conventional geophone. In an embodiment, an integrated circuit is used. In another embodiment, a discrete circuit is used. The voltage based signal is then digitized by the recording hardware at an analog to digital (A-to-D) box and then sent to seismic data recorder 44. A representative A-to-D box can be the I/O MRX box. The seismic data recorder may capture/transmit data to a computer for further processing and analysis. The data may also be transmitted to offices in any part of the world using the Internet to allow remote participation in decisions affecting the hydraulic fracturing outcome.

Figure 2:
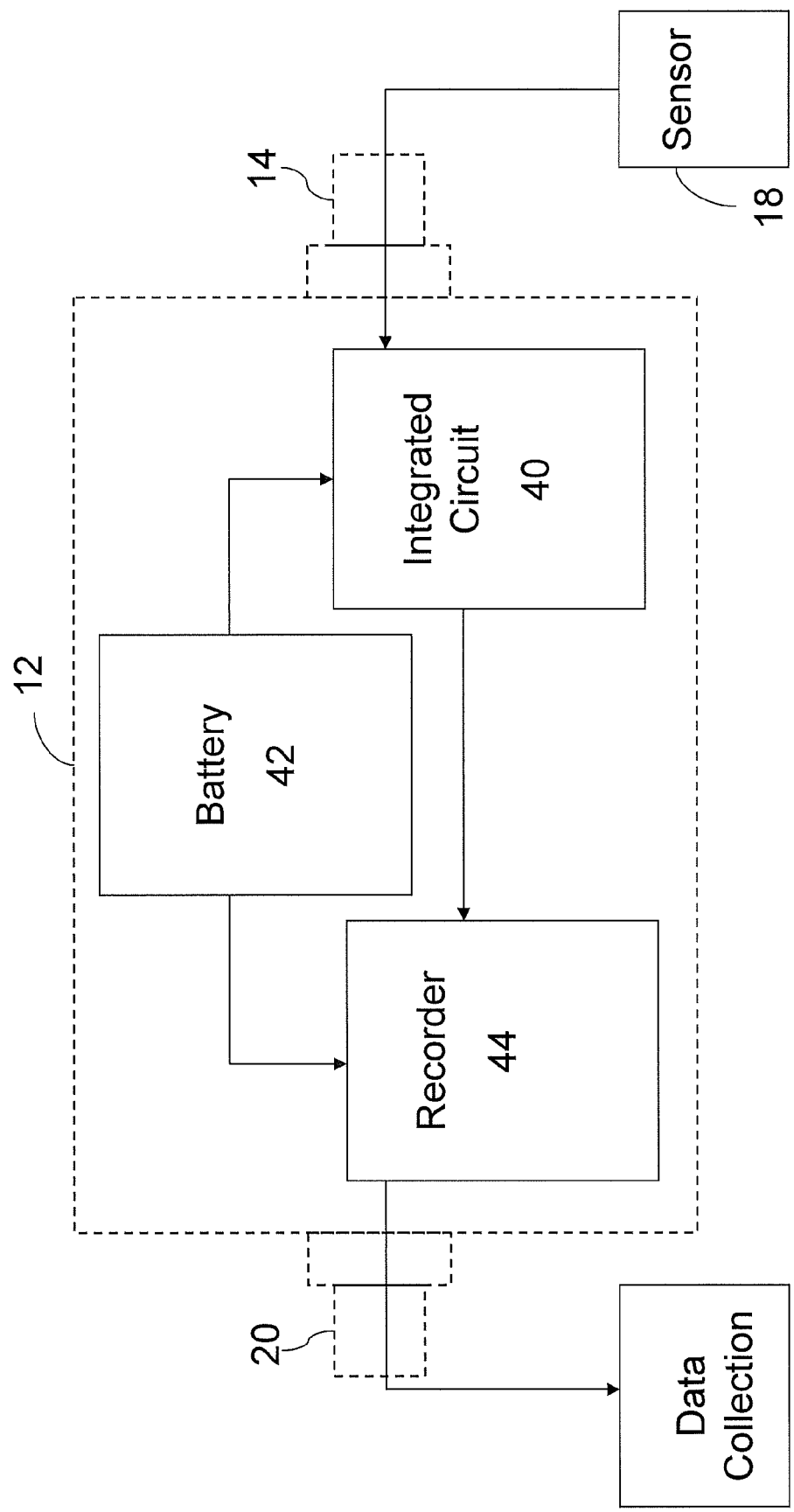
FIG. 2 is a schematic diagram illustrating another embodiment for evaluating the geometry of a fracture.

FIG. 2 illustrates an additional embodiment for evaluating the geometry of a fracture. The circuit 40, battery 42 and seismic data recorder 44 are disposed within housing 12. The battery 42 provides a power supply to both the circuit 40 and the seismic data recorder 44. Data from sensor 18 is transferred to circuit 40 wherein the electrical signal is converted to a voltage based signal compatible with the seismic data recorder. The voltage based signal is then sent to the seismic data recorder 44 and on to a data storage device, such as a tape or hard disk.

In determining electromagnetic data, for example, electromagnetic coils may be incorporated into the recorder itself. Alternatively, the electromagnetic coils may be attached to the seismic interface box via an external connection. In determining magnetic data, for example, a magnetometer, such as a three component fluxgate magnetometer, may be attached to the seismic interface box. An accelerometer, such as a MEMS® accelerometer a zero-length spring apparatus or similar device, may be attached to the seismic interface box for recording gravity measurements to map the impact of the fracture. Or, for example, a set of resistivity probes can be driven into the ground and an accurate resistance measurement made to determine the resistivity of the ground during the measurement.

In an embodiment, a method for evaluating the geometry of a fracture can comprise injecting (or otherwise introducing) an electrically active proppant into the fractures. The proppant in the fracture can be tracked or traced, thus allowing the characteristics of the fracture (i.e., height, width, depth, and/or trajectory) to be determined. For example, U.S. application Ser. No. 12/621,789 demonstrates visualizing reservoir fractures using electrically active proppants to carry electrical signals throughout the fracture and detecting the electrical signals at the surface. The electrically active proppant is then charged with an electrical signal. The electrical signal is then converted into a voltage based signal compatible with a seismic data recorder via an electrical methods seismic interface box.

A concern with conventional EM, resistivity or magnetic applications is separation of the regional, i.e., the earths natural field, drill rig noise ambient power lines etc., from the residual field, i.e., the field caused by the fracture or the detection problem, in 3D. In the present examples, the regional field is measured prior to fracture thus establishing the regional field prior to fracture. Since the equipment is fully deployed many measurements can be made to develop a summed and stacked average background prior to the start of the fracture process. Additionally, during and after the fracture initiation, the recorder can be running, continuously mapping the propagation of the fracture in 3D until it has stabilized. Once the fracture stabilizes, another series of measurements can be taken to establish the post fracture field. The post fracture field is a composite of the regional field and the fracture field. Thus, the difference between the pre- and the post-fracture measurements can be caused by the fracture itself and therefore a four dimensional (4D) measurement would accurately describe the fracture and eliminate the regional residual separation problem. By including this prior knowledge of the well bore and the fracture start point depth and direction, and given a constraint to the inversion of the residual 4D field to a specific area one could accurately locate and map the fracture body.

During the fracture process the fracturing crew creates a new feature of known chemistry at an initially known depth and allowing for measurement of the field pre- and post-injection of the fracture material. Thus, allowing for the feature to be visualized (the fracture) to be created by fracturing the well and injecting a jet or flow of known material with known properties into the rock. Because many of the detection variables are defined, i.e., the material, the depth, and the regional/residual, inversion is used to determine the geometry of the new fracture.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Ser. No. 12/468,088 filed May 19, 2009, Barron et al., "Method of Manufacture and use of a Functional Proppant for Determination of Subterranean Fracture Geometries."
2. U.S. Ser. No. 12/621,789 filed Nov. 19, 2009, Cramer, et al., "Controlled Source Fracture Monitoring."
3. U.S. Pat. No. 6,330,914, Hockings et al., "Method and Apparatus for Tracking Hydraulic Fractures in Unconsolidated and Weakly Cemented Soils and Sediments."
4. U.S. Pat. No. 7,073,581, Nguyen et al., "Electroconductive Proppant Compositions and Related Methods."

The invention claimed is:

1. An apparatus for mapping the geometry of a fracture comprising:
    a. a housing;
    b. at least one input connector forming part of the housing coupled to at least one sensor that measures data selected from the group consisting of: electrical, gravimetric, magnetic, and any combination thereof;
    c. a data output connector forming part of the housing coupled to a seismic data recorder; and
    d. a circuit disposed in the housing for convening the data from the sensor to be recorded by the seismic data recorder, wherein the circuit converts an electrical signal to a voltage based signal, wherein impedance and reactance balance the voltage based signal such that the voltage based signal is within sensitivity range of the sensor.

2. The apparatus according to claim 1, wherein the circuit converts the electrical signal into a voltage based signal compatible with a seismic data recorder.

3. The apparatus according to claim 1, wherein the circuit is an integrated circuit.

4. The apparatus according to claim 1, wherein the circuit is comprised of discrete components.

5. The apparatus according to claim 1, wherein the seismic data recorder is disposed in the housing.

6. The apparatus according to claim 1, wherein power is provided to the apparatus via a battery.

7. The apparatus according to claim 6, wherein the battery is externally located.

8. The apparatus according to claim 6, wherein the battery is located within the housing.

9. An apparatus for mapping the geometry of a fracture comprising:
    a. a housing;
    b. at least one input connector forming part of the housing coupled to at least one sensor that measures data selected from the group consisting of: electrical, gravimetric, magnetic, and any combination thereof;
    c. a circuit disposed in the housing for converting the data from the sensor, wherein the circuit converts an electrical signal to a voltage based signal, wherein impedance and reactance balance the voltage based signal such that the voltage based signal is within sensitivity range of the sensor;
    d. a seismic data recorder disposed in the housing; and
    e. a data output connector for transferring data from the circuit to the seismic data recorder.

10. The apparatus according to claim 9, wherein the circuit converts the electrical signal into a compatible voltage signal for a seismic data recorder.

11. The apparatus according to claim 9, wherein the circuit is an integrated circuit.

12. The apparatus according to claim 9, wherein the circuit is a discrete circuit.

13. The apparatus according to claim 9, wherein power is provided to the apparatus via a battery.

14. The apparatus according to claim 13, wherein the battery is externally located.

15. The apparatus according to claim 13, wherein the battery is located within the housing.

* * * * *